3,358,282
DEVICE FOR GENERATING HIGH FREQUENCY PULSES HAVING A PREDETERMINED FREQUENCY BY MEANS OF A CONTINUOUSLY TUNABLE MAGNETRON
Nils Arne Erland Wästerlid, Skalby, Sweden, assignor to North American Philips Company, Inc., New York, N.Y., a corporation of Delaware
Filed June 1, 1966, Ser. No. 554,531
Claims priority, application Sweden, June 3, 1965, 7,301/65
9 Claims. (Cl. 343—14)

ABSTRACT OF THE DISCLOSURE

A radar system is described in which the tuning frequency of the magnetron is continuously varied. The local oscillator is slaved to the magnetron tuning frequency prior to each triggering of the magnetron, and held constant during the echo period. A quantity related to the oscillator frequency, such as a control voltage for the oscillator, or the oscillations themselves, are applied to a triggering unit in order to generate a triggering pulse for the magnetron whenever the quantity attains a predetermined level.

---

The present invention relates to a device for generating and transmitting high frequency pulses having a predetermined frequency by means of a tunable magnetron, the tuning of which is varied continuously during transmission and which cooperates with means for instantaneous excitation of the magnetron. The frequency of the transmitted pulse is determined by the tuning frequency at the triggering moment. The invention may for example be used in radar equipments in which it is required to transmit a series of pulses having a predetermined frequency which can be different from instant to instant, and which must be accurately adjustable, or where it is required to change frequency from pulse to pulse between predetermined frequencies according to a certain program, or possibly where it is required to transmit pulses having frequencies varying at random within a small frequency band surrounding a predetermined adjustable center frequency. The maintenance of a certain predetermined frequency of the transmitted pulses may be required in such cases when the pulses are directed against a target having a frequency sensitive indication device of any kind, a transponder or the like, which is adjusted to a certain frequency and which does not react upon pulses of different frequency. Shifting between different frequencies according to a predetermined program may for example be used if it is required to make a slow frequency sweep across a certain frequency region, in which case the frequency variation program involves stepwise variation of the frequency from pulse to pulse in one and the same direction until the whole frequency region has been scanned. Frequency programs of other kinds are, however, also required in certain cases. Frequency shifting at random within a small frequency band can be used if disturbances appear within the frequency range of the magnetron, but measurements have indicated that these disturbances are appreciably smaller or missing within a portion of the frequency range, the center frequency then being adjusted to a value lying within the portion which is free from disturbances. The invention is, however, not limited to radar equipments but can advantageously also be used for identification purposes in which case instead of echo pulses a reply signal of other kind having a certain required information is received.

In the case of radar equipments the received echo pulses are mixed with the output frequency of a local oscillator included in a receiver for generating an intermediate frequency signal. For achieving small band width in the receiver it is then required that the local oscillator during a certain time interval after transmission of a radar pulse, i.e., the echo time, is locked at a frequency value which deviates a certain magnitude (i.e., the intermediate frequency) from the frequency of the transmitted pulse. In a previously proposed radar equipment comprising a continuously tunable magnetron, which equipment is adapted to transmit pulses varying in frequency at random from pulse to pulse, triggering of the magnetron is produced by comparing the continuously varying cold tuning frequency, of the same with the local oscillator frequency. Before the triggering and during the whole echo time interval the local oscillator is locked at a predetermined frequency value, the triggering being effected when the tuning frequency and local oscillator frequency coincide. The intermediate frequency in the receiver will then be equal to the difference between the cold and warm frequencies of the magnetron. The comparison between the tuning frequency and the oscillator frequency for the purpose of triggering the magnetron has in this known equipment been made such that the local oscillator energy is fed to the output cavity of the magnetron and the local oscillator energy reflected from the output cavity detected, triggering of the magnetron being initiated by the instantaneous decrease or dip in the reflected energy arising when the local oscillator frequency coincides with the tuning frequency. By locking the local oscillator frequency at a new value for each triggering then a varying frequency from pulse to pulse of the transmitted pulses will be achieved. The frequency of the local oscillator is in the known system set upon a valve varying at random for each new triggering and the frequency of the transmitted pulses will then also vary at random from pulse to pulse. This device could, however, easily be modified to transmit pulses having a predetermined frequency by locking the oscillator frequency on a certain, accurately adjustable value or bringing the same to change frequency between predetermined values.

A draw-back of this system is that the locked oscillator frequency forms a relatively inaccurate measure of the frequency of the transmitted radar pulse resulting in that the pulse will have large frequency variations for one and the same setting of the local oscillator frequency, whereby the receiver must be made with a relatively large band width. This depends upon the always present time delays in the triggering circuits, which delays result in that the radar pulse is not transmitted at the moment of initiating the triggering but a small interval later. During this intreval the frequency of the magnetron changes a certain value in the one or the other direction dependent upon the inclination of the tuning curve at the actual triggering moment. A further contributary cause to the said wide band of the receiver is that the said dip in the reflected energy used for initiating the triggering has a relatively large extension in time and the triggering pulse for the magnetron may appear practically anywhere during the said dip. This produces an inaccuracy in the triggering moment relative to the frequency coincidence point and thus an inaccuracy in the frequency determination. Another draw-back of this proposed system is that the shape and magnitude of the said dip used for triggering will be dependent upon the variation speed of the tuning frequency of the magnetron and if the tuning frequency, as in most cases, varies substantially according to a sinusoidal-shaped curve with time this will result in that the whole frequency variation range of the magnetron cannot be utilized due to the fact that the said dip at the outermost portions of the variation region will be so flat that it cannot initiate triggering.

In order to eliminate these draw-backs another system has been proposed in which the local oscillator frequency follows the variations in the magnetron frequency in an interval before triggering and is not locked until the triggering moment. Hereby the great advantage is achieved that the delays of the triggering circuits substantially do not influence the intermediate frequency and required band width in the receiver, as the frequency locking of the oscillator will be delayed substantially in the same degree as the excitation of the magnetron and the local oscillator frequency will consequently follow the magnetron frequency substantially until the transmission moment. According to a known principle "slaving" of the local oscillator to the magnetron is produced by frequency modulating the output energy of the oscillator, whereafter this frequency modulated energy is fed to the tunable output cavity of the magnetron and the energy reflected from the cavity finally detected. The A.C.-voltage of modulation frequency produced by the said detection has zero passage and polarity change at coincidence between the oscillator frequency and the tuning frequency of the magnetron and the said voltage is therefore used after rectification in a phase sensitive rectifier for producing a control voltage for the oscillator, which brings the center frequency of the oscillator to substantially coincide with the tuning frequency. This follow control or "slaving" of the oscillator to the magnetron is interrupted at the triggering moment, whereafter the oscillator frequency is kept at a constant value substantially equal to the value prevailing at the triggering moment during the whole echo time interval.

As the local oscillator frequency in this system is automatically adjusted to coincide with the tuning frequency until the triggering moment it is possible to select the triggering moment as required. The triggering in the known system is effected by means of triggering pulses produced in a separate unit which pulses may appear with constant intervals or with intervals varying at random. The frequency of the transmitted pulses will in both cases vary at random from pulse to pulse provided that the interval between the triggering pulses in the case of constant triggering intervals is not correlated to the tuning period time. If it is required to transmit pulses having a certain predetermined constant frequency by means of this known equipment, this can in principle be achieved by correlating the trigger pulse generation with the magnetron tuning such that triggering pulse is always produced at a certain phase position of the tuning curve. By this means, however, no effective check on the frequency of the transmitted radar pulse is achieved and difficulties will arise especially if it is required to change frequency from pulse to pulse between certain accurately determined frequencies.

The invention has for its purpose to solve this problem and with maintenance of the advantages relating to especially the small band width in the receiver resulting from the said frequency control of the local oscillator until the triggering moment make possible transmission of pulses of a certain accurately determined frequency or change between different predetermined frequencies or possibly transmission of pulses of frequencies varying at random within predetermined frequency bands. The invention also has for its purpose to make it possible to modify a radar equipment in a simple way so that it can be used for other purposes than radar scanning, for example identification purposes.

According to the invention, in a high frequency equipment of described kind comprising a continuously tunable magnetron and an auxiliary oscillator which in an interval before triggering is slaved to the magnetron, triggering of the magnetron is initiated by applying a magnitude derived from the auxiliary oscillator and representing the instantaneous oscillator frequency to a trigger pulse generating device. This device is adapted to react at a predetermined value on the said magnitude and produce triggering at a predetermined tuning frequency of the magnetron. The auxiliary oscillator may be the local oscillator which is normally included in the equipment for producing an intermediate frequency signal from incoming reply pulses, for example echo pulses, which local oscillator is controlled such that the frequency of the same is locked at a predetermined value during the reception intervals.

The local oscillator frequency can for example be represented by a control voltage fed to the oscillator, in which case triggering is initiated upon reaching of a predetermined level on the said control voltage. Alternatively, it is possible to sense the output frequency of the oscillator, for example by means of a cavity resonator, and produce triggering at coincidence between the oscillator frequency and the resonance frequency of the cavity. An advantage of this arrangement is that the frequency of the transmitted pulses will have a very high frequency stability in time.

Shifting between different predetermined frequencies can be produced easily in both cases; in the said first case by varying the reference voltage from pulse and in the said last case by using a number of cavities having different resonance frequencies and making these cavities effective in successive order according to a predetermined program.

In the case of triggering by voltage measurement it is possible to change frequency at random within a predetermined small frequency band, the center point of this frequency band being shifted according to a predetermined program. The said last arrangement may for example be utilized if disturbances appear within certain portions of the frequency range, in which case a frequency band for transmission is selected in which the disturbances are small or missing.

The invention is illustrated by means of example in the accompanying drawings, in which.

Figure 1:
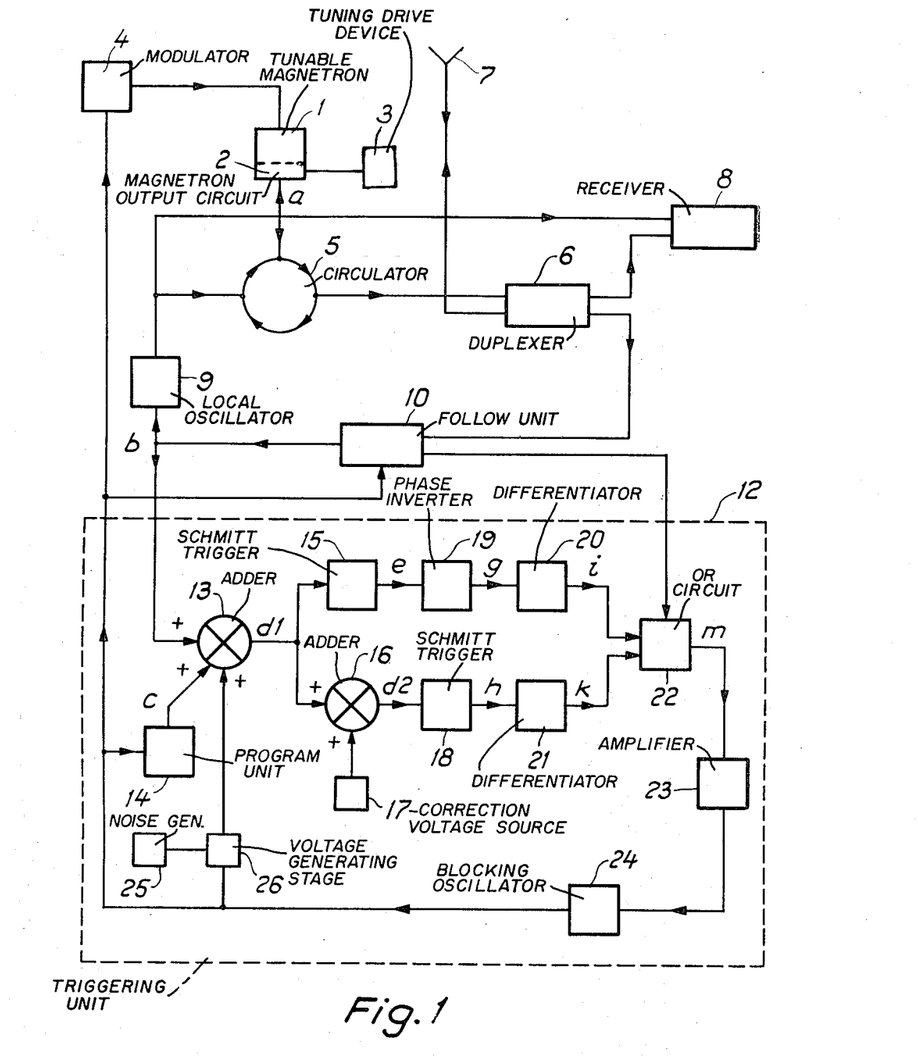
FIG. 1 shows a block diagram of a radar equipment with a device according to the invention.

The shown radar equipment comprises a transmitter tube in the form of a magnetron 1 with a tunable output circuit 2, which tube for example may be the tube described in U.S. Patent No. 2,931,943. The magnetron is triggered by means of a modulator 4 and the tuning is varied continuously substantially according to a sinusoidal shaped curve by means of a device 3. The output is connected to a circulator 5 which leads the produced pulses to a duplexer 6. The pulses have a high magnitude and are led by the duplexer to an antenna 7 for transmission in the required direction. The antenna 7 also serves as a receiving antenna for the echo pulses. These pulses have a low magnitude and are led by the duplexer to a receiver 8 where they are mixed with the output voltage from a local oscillator 9. The circulator also leads the output voltage of the local oscillator to the output circuit 2 of the magnetron 1, while the local oscillator energy reflected from the output circuit 2 is led by the circulator to the duplexer 6. The energy reflected from the output circuit has a small power content and is coupled by the duplexer to a follow unit 10. This unit has its output connected to a frequency control electrode of the oscillator so that a closed loop regulation circuit is formed. The oscillator is in this circuit controlled by means of a control voltage from the follow unit 10 such that the oscillator in an interval before triggering of the magnetron is brought to oscillate at a frequency which is substantially equal to the instantaneous tuning frequency of the magnetron.

The follow unit 10 may for example be constructed as described in U.S. Patent 3,249,937 and comprise a frequency modulation oscillator for frequency modulating the local oscillator 9 and a phase sensitive rectifier the reference voltage of which is formed by the output voltage from the frequency modulation oscillator and the signal voltage of which is formed by the local oscillator energy reflected from the output circuit 2 of the magnetron 1. The output voltage from the phase sensitive rectifier will then be a measure of the difference between the frequency of the local oscillator 9 and the tuning frequency of the magnetron 1 in respect to magnitude and sign. The amplified output voltage from the phase sensitive rectifier is added to the output voltage of the frequency modulation oscillator and the sum voltage is used as control signal to the oscillator, which is controlled by negative feed back in the closed loop regulation circuit such that the center frequency of the same substantially coincides with the tuning frequency of the magnetron.

The follow unit comprises furthermore disconnection means for opening the regulation circuit at triggering of the magnetron and memory means, for example such as a capacitor, for locking the control voltage of the oscillator during the echo time interval on the value prevailing at the triggering moment.

Means are furthermore arranged for controlling the oscillator such that the frequency of the same is brought rapidly to coincide with the tuning frequency of the magnetron at the end of the echo time and make the described frequency control effective until the next triggering.

In the interval before triggering when the local oscillator is slaved to the magnetron as described, the control voltage delivered from the follow unit 10 to the local oscillator will be a measure of the instantaeous tuning frequency, which is utilized according to the invention for producing triggering of the magnetron at a predetermined frequency or at predetermined frequencies.

Triggering of the magnetron is effected in the device according to FIG. 1 by means of a triggering unit 12 delivering triggering pulses to the modulator 4 and which unit receives control information from the output of the follow unit 10. The triggering unit 12 consists of an adding circuit 13 receiving at one of its inputs the said control information from the follow unit 10 and at a second input reference voltage from a program unit 14. The sum voltage from 13 is led on the one hand to a first Schmitt-trigger stage 15 and on the other hand via an adding device 16 for adding a correctivee voltage from a device 17 to a second Schmitt-trigger stage 18. The two Schmitt-trigger stages 15 and 18 produce in a way known per se an output voltage of a certain value as soon as the applied voltage exceeds a predetermined level and rest voltage, for example zero voltage, at an applied voltage which is less than the said level. The Schmitt-trigger stages, however, have a somewhat different switching and return levels and for this reason two Schmitt-trigger stages are used, the device 17 being adapted to compensate for this difference by adding a voltage equal to the said difference. The output voltage of the Schmitt-trigger stage 15 is differentiated in a differentiating circuit 20 after phase inversion in a phase inversion stage 19 and the output voltage of the Schmitt-trigger stage 18 is differentiated in a differentiating circuit 21. The differentiated pulses from 20 and 21 are applied to an OR-circuit 22 which passes only the positive pulses from 20 and 21. The OR-circuit 22 also receives blocking voltage from the follow unit 10 during those intervals after the end of the echo time interval when the local oscillator is rapidly adjusted to be slaved to the magnetron, so that triggering pulses cannot be produced during the said adjusting interval. The pulses from OR-circuit 22 are amplified in a pulse amplifier 23 and thereafter led to a blocking oscillator 24 which for each received pulse produces a triggering pulse of suitable shape for the modulator 4. The triggering pulse from blocking oscillator 24 is also led to the follow unit 10 for interrupting the slaving of the local oscillator 9 to the magnetron and locking the frequency of the local oscillator during the echo time interval on the value prevailing at the triggering moment. The pulse from 24 is in the shown example also led to the program unit 14 for bringing unit 14 to deliver a new reference voltage to the adding circuit 13 after each triggering. The shifting between different levels from the unit 14 may for example be carried through according to a predetermined program.

Figure 2:
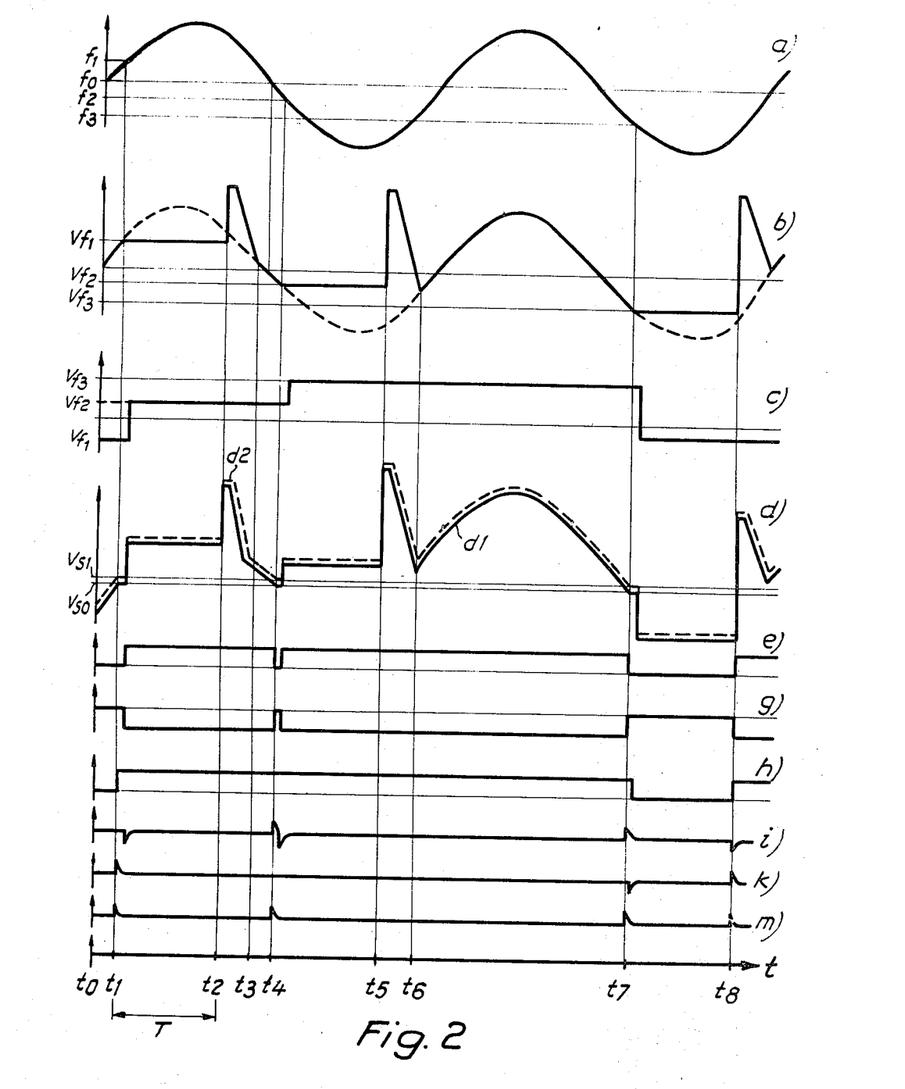
FIG. 2 shows some time diagrams for explanation of the function of the device according to FIG. 1.

The triggering procedure is illustrated by means of the time diagrams in FIG. 2. The first diagram $a$ shows the tuning frequency of the magnetron as function of time, while the next diagram $b$ shows the control voltage fed from the follow unit 10 to the local oscillator 9. The frequency produced by oscillator 9 is substantially proportional to the applied voltage and the curve shown in diagram 2$b$ is also representative for the produced local oscillator frequency. In diagram 2$c$ is shown a program output voltage (reference voltage) from program unit 14 chosen as an example. The diagram 2$d$ shows on the one hand the output voltage from adding circuit 12 (curve $d3$) and on the other hand the output voltage from adding circuit 16 (curve $d2$), i.e., the voltages applied to the Schmitt-trigger stages 15 and 18, respectively. The output voltage of Schmitt-trigger stage 15 is shown in diagram 2$e$ and the voltage produced by the phase reversal in 19 in the next diagram 2$g$, while the output voltage from Schmitt-trigger stage 18 is shown in diagram 2$h$. The output pulses from differentiation circuits 20 and 21 are shown in diagrams 2$i$ and 2$k$, respectively, while the output pulses from OR-circuit 22 are shown in the last diagram 2$m$.

It is assumed that the described frequency control of the oscillator 9 is effective at time moment $t_0$ in FIG. 2 so that the frequency of the oscillator follows the tuning frequency of the magnetron 1, which frequency according to diagram 2$a$ varies substantially according to a sinusoidal curve about a center frequency $f_0$. The voltage from follow unit 10 which is representative for the local oscillator frequency will in this slave interval also be representative for the tuning frequency of the magnetron and varies in rhythm with the tuning frequency (interval $t_0-t_1$). The voltage from the program unit 14 is adjusted to a level designated $v_{f1}$. Also the voltages from adding circuits 13 and 16 will in this interval follow the tuning frequency, but due to the adding of the voltage from program unit 14 these voltages are on a different level as compared with the control voltage from follow unit 10. The output voltages from the said adding circuits is more particularly in this interval below the triggering level of the Schmitt-trigger stages 15 and 18 (diagram 2$d$). The trigger level of the Schmitt-trigger stages is in diagram 2$d$ designated $v_{s1}$ and the return level $v_{s0}$. A voltage which is exactly equal to the difference between $v_{s1}-v_{s0}$ (about 100 mv.) is added in adding circuit 16 to the output voltage from adding circuit 13 so that the output voltage from circuit 16 (diagram $d2$) is somewhat higher than the output voltage from circuit 13 (diagram $d1$). The input voltage of the stage 18 reaches the trigger level at moment $t_1$. The voltage increase at the output of stage 18 produced hereby causes a positive differentiated pulse from circuit 21. This pulse passes through the OR-circuit 22 and generates a triggering pulse for the magnetron. The tuning frequency of the magnetron (cold frequency) at the triggering moment is designated $f_1$ and the transmitted pulse thus will have a frequency which deviates from $f_1$ with a magnitude equal to the difference between the cold and warm frequencies of the magnetron at moment $t_1$. The triggering pulse also causes interruption of the frequency control of the local oscillator 9 and locking of the control voltage of the oscillator and therefore the local oscillator frequency substantially upon the value prevailing in the triggering moment ($v_{f1}$) during a time interval T after $t_1$ equal to the echo time interval. A short interval after the appearance of the triggering pulse the program unit 14 automatically changes its output voltage or reference voltage to a new value designated $v_{f2}$, which in the shown example is assumed to be higher than the previous reference voltage. Then the input voltage of Schmitt-trigger stage 15 will also reach the trigger level. The switching of stage 15, after phase inversion in the stage 19 and differentiation in circuit 20, causes a negative differentiated pulse, which is suppressed in the OR-circuit 22 and consequently cannot cause new triggering of the magnetron. A flip-flop included in unit 10 will change its condition at the end of the echo time interval and produce an instantaneous increase of the control voltage of the oscillator 9 so that the oscillator frequency increases stepwise to a value which is higher than the highest frequency value from magnetron (moment $t_2$), where possible the control voltage and consequently the oscillator frequency is brought to make a rapid sweep in the opposite direction. The frequency sweep continues until the local oscillator frequency again coincides with the tuning frequency of the magnetron, at which moment the described slaving of the local oscillator to the magnetron is again made effective (moment $t_3$). It has been assumed that this now occurs at negative slope of the tuning curve of the magnetron so that the control voltage of the local oscillator in this slaving interval also will have a negative slope. The input voltage of the Schmitt-trigger stages 15 and 18 is higher than the triggering level during the whole interval from the foregoing triggering so that both stages are in their triggered state during this interval. The input voltage of the stage 15 reaches the return level at moment $t_4$. The output voltage from stage 15 is then decreased stepwise which produces a corresponding voltage increase at the output of the phase reversal stage 19. The voltage increase from stage 19 is converted in differentiation circuit 20 to a positive pulse which is passed by OR-circuit 22 and causes triggering pulse to modulator 4 and triggering of the magnetron 1. The cold frequency at the triggering moment is designated $f_2$. The local oscillator frequency is at the triggering moment as before and kept on the actual value designated $v_{f2}$ during the whole echo time interval. The program unit 14 automatically changes its output voltage to a new value designated $v_{f3}$ after a short interval. The triggering of stage 15 caused hereby gives rise to a negative pulse from differentiation circuit 20, which pulse, however, is suppressed in circuit 22 and thus will not cause any triggering. The second Schmitt-trigger stage 18 having a somewhat higher input voltage than stage 15 has never reached its return level and is still triggered. A frequency jump occurs as before at the end of the echo time interval (moment $t_5$) followed by a rapid frequency sweep of the local oscillator until the frequency of the same again coincides with the tuning frequency, at which moment the slaving of the oscillator to the magnetron is made effective, moment $t_6$. At moment $t_7$ the input voltage of stage 15 intersects the return level which causes a positive pulse from 20 and triggering of the magnetron at frequency $f_3$ and locking of the control voltage of the oscillator upon the value $v_{f3}$. The input voltage of both stages 15 and 18 in this case intersects the triggering level during the period at the end of the echo time interval when the oscillator is again slaved to the magnetron (moment $t_8$) so that both stages are triggered. Blocking voltage led from follow unit 10 to the OR-circuit 22 during this catching period, however, prevents that triggering pulse, similar to that shown in dotted lines at the right in diagram $2m$ from being delivered by circuit 22.

At positive slopes of the tuning curve and consequently of the control voltage curve, triggering of the magnetron will as shown be initiated by stage 15 while stage 18 is made effective for initiating triggering of the magnetron at negative slopes of the tuning curve. By using two Schmitt-trigger stages and by feeding a correction voltage equal to the difference between triggering and return levels to one of the stages triggering will in both cases be effected at the same level of the voltage from adding circuit 13, namely the level which in the diagram $2d$ is designated $v_{is0}$. The triggering point will be dependent upon the reference voltage from program unit 14 added to the control voltage from unit 10 in adding circuit 13 and the frequency of transmitted pulse will therefore be unambiguously determined by the reference voltage level from unit 14. The said level may as shown be varied from pulse to pulse according to a predetermined program or kept constant for transmission of a series of pulses having a predetermined frequency, which frequency can, if desired, be changed from instant to instant. The time distance between succeeding pulses will in the case of programmed frequency change vary in dependence upon the length of the slave intervals in each case.

A voltage of low amplitude and varying at random may if desired be superimposed upon the reference voltage derived from the program unit, which voltage may for example be produced by a noise generator 25 and a voltage generating stage 26. The stage 26 produces at its output a voltage varying at random, which voltage is normally maintained constant but which changes to a new value each time a switching pulse is led to the stage. This pulse may as shown be formed by the triggering pulse for the magnetron, if required after time delay of the same, the new voltage value being determined by the signal delivered from the noise generator. The voltage from 26 is added in adding circuit 13 to the reference voltage from unit 14 and forms with this voltage an effective reference voltage equal to the sum of the voltages. With the voltage generator 25, 26 in function required center frequency, which if desired can be varied according to a predetermined program, is first set in unit 14 and the transmitted pulses will then vary in frequency at random about the value set in 14 within a small frequency band determined by the voltage generator 25, 26, the width of the said frequency band being also adjustable.

Figure 3:
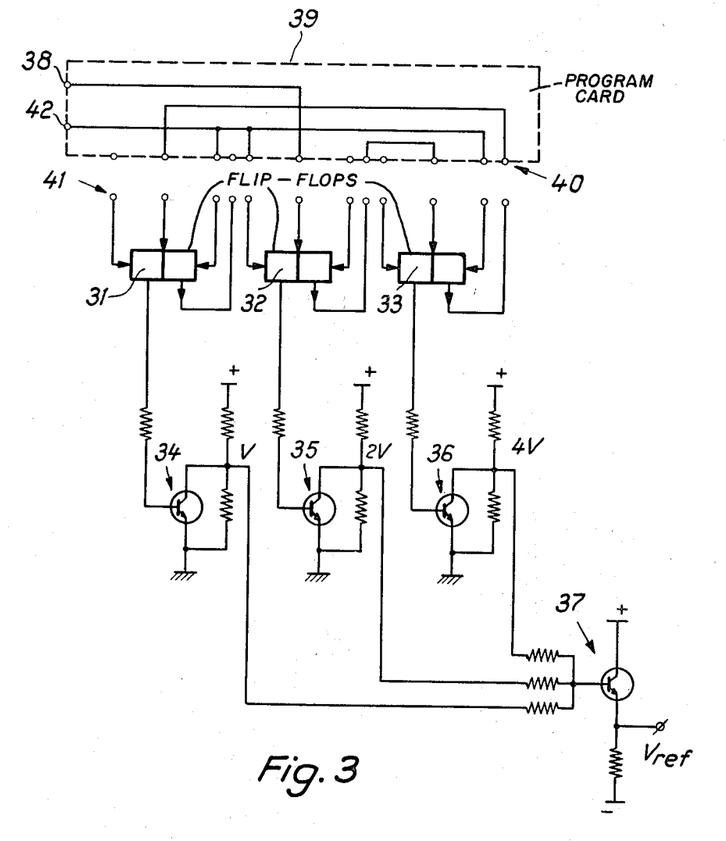
FIG. 3 shows an embodiment of a program unit included in the device according to FIG. 1 chosen as an example and FIG. 4 shows a modification of the device according to the invention.

FIG. 3 shows a simple program unit chosen as an example, which may be used in the radar equipment shown in FIG. 1 for generating reference voltages for the adding circuit 13 (FIG. 1). The unit consists of a number, in the shown example three, bistable flip-flops 31, 32, 33 with a transistor stage 34, 35, 36 controlled from each flip-flop and an output adding circuit 37. Each flip-flop can assume 0 or position 1 and delivers in the first case a voltage to the respective transistor stage which holds the transistor conductive and in the said last case a voltage which makes the transistor non-conductive. The transistor stage delivers in conductive condition of the transistor the voltage 0 and in non-conductive condition of the transistor a positive voltage having a certain amplitude to the adding circuit. The voltages delivered from the stages 34, 35 and 36 in non-conductive condition of the respective transistor is assumed to be 1V, 2V and 4V, respectively. If the adding resistances are assumed to be equal then a program voltage or reference voltage $v_{ref}$ will be delivered at the output of adding circuit 37 which is variable between eight different values: 0, V, 2V, 3V, 4V, 5V, 6V, 7V in dependence upon the setting of the binary counter formed by the flip-flops 31, 32, 33. Each value of the reference voltage corresponds according to the foregoing to a predetermined frequency of the local oscillator in the moment of triggering and consequently a predetermined frequency of the transmitted pulse.

The switching of the flip-flops is effected automatically by means of the triggering pulses for the magnetron, which pulses are led to an input 38 of a replaceable program card 39. The program card consists in the shown example of a certain pattern of electrical conductors connected to contacts 40 situated on the card, which contacts are brought in electrical connection with opposite fixed contacts 41 leading to the flip-flops at the introducing of the card in a support for the same. The said fixed contacts 41 are connected to three inputs and an output of each flip-flop. Triggering pulse appearing upon the center input of each flip-flop produces alternatingly switching of the flip-flop to position 1 and position 0, while pulse appearing on the left input produces switching to zero-position and pulse on the right input produces switching to position 1. At switching from position 1 to position 0 of a flip-flop a voltage change is appearing at the right output which can be used for triggering another flip-flop.

The program card is furthermore provided with a zero setting input 42 to which a zero setting pulse is led for setting the flip-flops in their initial positions. The zero setting input is in the shown example connected to the right input of flip-flop 31 and the left input of flip-flops 32 and 33, which means that the flip-flop 31 will be in position 1 and flip-flops 32 and 33 in position 0 initially. The control input 38 to which the triggering pulses for the magnetron are applied is connected directly to the control input of flip-flop 32, while the flip-flop 33 is controlled from the output of flip-flop 32 and flip-flop 31 is controlled from the output of flip-flop 33.

The function is as follows:

In initial condition adding circuit 37 will deliver a reference voltage at its output which is equal to V and when starting the radar equipment therefore the first pulse transmitted from the equipment will have a frequency corresponding to the voltage V. The triggering pulse causing transmission of the radar pulse switches flip-flop 32 to position 1 whereby the reference voltage a short interval after the transmission will change to 3V. The next radar pulse transmitted from the equipment will consequently have a frequency corresponding to the voltage 3V. At the transmission of this pulse flip-flop 32 will return to zero position and switches the flip-flop 33 to position 1, whereby the reference voltage is changed to 5V. At the transmission of the radar pulse having a frequency corresponding to this voltage flip-flop 32 will again be switched to position 1 and a reference voltage of 7V is produced. At the transmission of the next radar pulse all flip-flops are returned to zero position and the reference voltage is changed to 0. The reference voltage is then in successive order changed to 2, 4 and 6V at the following triggerings. After transmission of the radar pulse having a frequency corresponding to the said last reference voltage flip-flop 31 will be in position 1 and 32 and 33 in position 0, which is equal to the initial position and the procedure is repeated.

The frequency can be brought to vary according to a different program by replacing the program card by another card having different connections; however, the frequency combinations which can be achieved by means of this simple device will not be equal to the maximum number of setting combinations of the flip-flops 31–33. The program unit can, however, easily be modified by means of logic circuit elements such that all possible combinations can be used.

Figure 4:
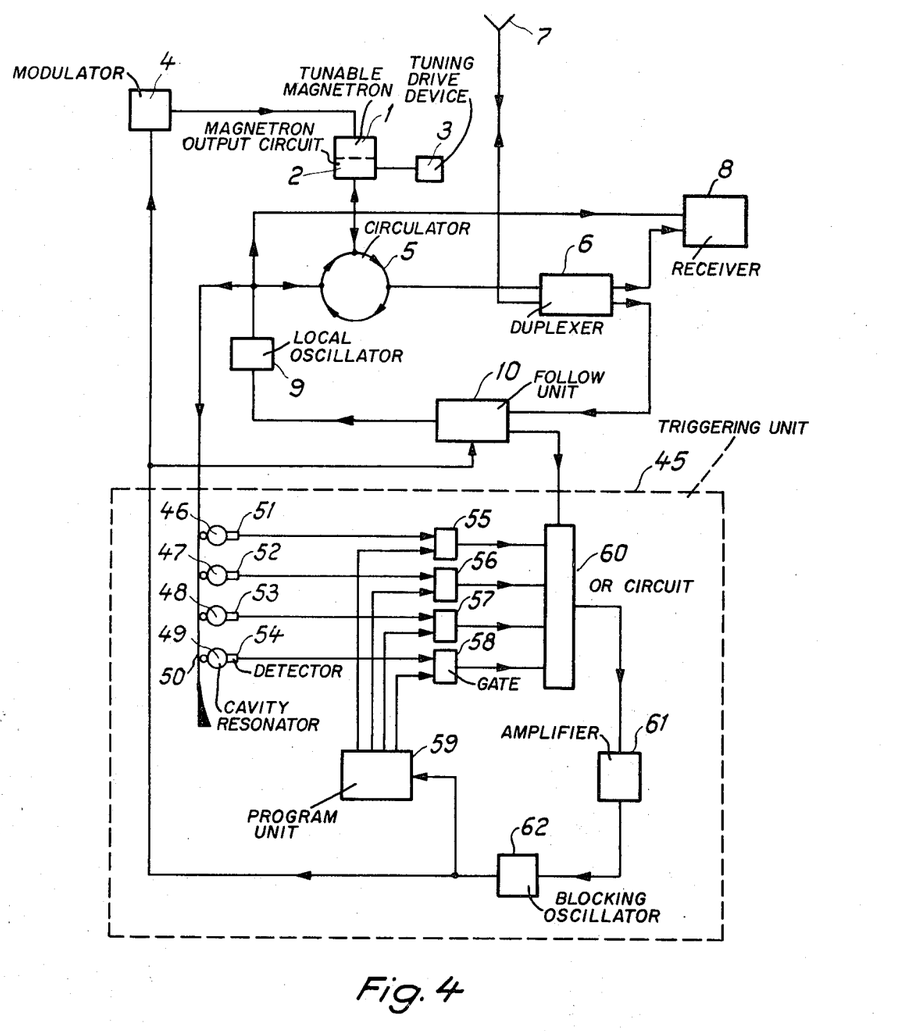

The device according to FIG. 1 is very flexible and permits transmission of any selected frequencies within the frequency range of the magnetron according to predetermined and replaceable programs. The device can, however, be less suitable in certain cases when it is required to maintain a very high frequency stability with time of the transmitted pulses due to the fact that the frequency of the transmitted pulses is dependent on the relation frequency-control voltage of the local oscillator 9. Thus if the said relation is varied, pulses of different frequencies will be generated by the magnetron for one and the same reference voltage from program unit 14. FIG. 4 shows a device which can be used for eliminating this draw-back for achieving a higher frequency stability than is possible in the described arrangement. The shown device is equal to the device according to FIG. 1 except from the fact that the voltage sensitive triggering unit 12 in FIG. 1 has been replaced by a triggering unit 45 operating directly upon the output frequency of the local oscillator. The triggering unit 45 consists according to FIG. 4 of a number of cavity resonators 46, 47, 48, 49 which are connected on the one hand to a wave guide 50 leading from the output of the local oscillator and on the other hand to detectors 51, 52, 53, 54. These detectors are in turn connected to a first input of gates 55, 56, 57, 58, which gates have a second input connected to a program unit 59. The output from the gates are connected to an OR-circuit 60 followed by a pulse amplifier 61 and blocking oscillator 62, which oscillator is connected to the modulator 4 of the magnetron. The program unit produces opening voltages for the gates in successive order, the order being determined in each case by means of a program card. The triggering pulses from the blocking oscillator are applied to the program unit for opening a new gate after each triggering. The OR-circuit 60 receives as in the foregoing example blocking voltage from the following unit during the time at the end of the echo time interval when the local oscillator is again "caught" by the magnetron.

Triggering is in this case effected by means of the pulses delivered by the detectors as soon as the local oscillator frequency coincides with the resonance frequency of the respective cavity. That gate which is open for the moment will then pass the pulse from the respective detector, which pulse causes triggering of the magnetron. The frequency of the transmitted pulse will therefore be determined by the resonance frequency of the selected cavity. Thus, the frequency of the transmitted pulses will only depend upon the mechanical dimensions of the cavity, which dimensions can be maintained with a very high accuracy.

A number of modifications of the described equipment are possible within the scope of the invention. Thus it is possible to produce slaving of the local oscillator to the magnetron in the intervals before triggering by means of position transducers or the like, which are sensitive for the position of the tuning member of the magnetron and which position transducers for example as in the described example produce a voltage which is representative for the tuning frequency of the magnetron, which voltage is used as control voltage for the local oscillator.

The described principle for transmission of high frequency pulses of a predetermined frequency or pulses with a frequency which varies according to a predetermined program can also be used in equipments of other kind, for example identification equipments. The slaved oscillator can also in this case be utilized as local oscillator during the reception intervals, the oscillator frequency, however, being locked in this case during reception on one and the same value independently of the transmitted frequency. The follow system and the triggering unit may be built up in exactly the same manner as described for the radar equipment except from the said difference in the locking circuits of the oscillator.

What is claimed is:

1. In a system for transmitting pulses of high frequency energy of predetermined frequency, said system comprising a magnetron having a tunable circuit, a source of a pulsatory excitation signal connected to said magnetron, means for continuously varing the tuning of said tunable circuit, whereby said magnetron is excited at each occurrence of a pulse of said excitation signal to transmit a pulse of high frequency energy of a frequency determined by the tuning of said tunable circuit at the instant of excitation, an auxiliary oscillator, and control means connected to said auxiliary oscillator for controlling the frequency of said oscillations to follow the tuning frequency of said tunable circuit at least for an interval of time immediately preceding each excitation of said magnetron by said excitation signal; the improvement wherein said source of a pulsatory excitation signal comprises means including a pulse generating device, means applying an electrical quantity corresponding to the instantaneous oscillator frequency to said source, and means connected to said pulse generating device and responsive to the occurrence of a predetermined value of said electrical quantity for energizing said pulse generating device to generate a pulse for energizing said magnetron.

2. The system of claim 1 in which said control means comprises means for producing a control voltage corresponding to the frequency of said oscillations, wherein said electrical quantity is said control voltage, and said means responsive to the occurrence of a predetermined value of said electrical quantity comprises threshold device means for producing a signal for energizing said pulse generating device when said control voltage passes a predetermined voltage level.

3. The system of claim 2 in which said threshold device means comprises first and second channels and an OR circuit, means applying said control voltage to the inputs of said first and second channels, means connecting the outputs of said first and second channels to said OR circuit, and means for applying the output of said OR circuit to said pulse generating device, each of said first and second channels comprising trigger circuit means for producing an output pulse when the voltage applied thereto passes a predetermined voltage level, and one of said channels comprises means for inverting the output thereof.

4. The system of claim 3 in which said first channel comprises in the order named a first Schmitt-trigger circuit, an inverter, and a differentiator, and said second channel comprises in the order named a second Schmitt trigger circuit and a differentiator, each of said trigger circuits having substantially the same trigger level, and means for adding a compensating voltage to the input of one of said channels substantially equal to the difference between the switching and return voltages of said trigger circuits.

5. The system of claim 2 comprising a source of variable voltage, means applying said pulsatory energizing signal to said source of variable voltage whereby said source of variable voltage changes its output voltage level upon the occurrence of a pulse of said pulsatory energizing signal, and means adding the output voltage of said source of variable voltage to said control voltage before said control voltage is applied to said means responsive to the occurrence of a predetermined value of said electrical quantity.

6. The system of claim 2 in which said control means comprises means for holding the frequency of said auxiliary oscillations constant for a predetermined time following each occurrence of a pulse of said pulsatory energizing signal, comprising means for inhibiting application of the output of said threshold means to said pulse generating means during the time the frequency of said oscillation is held constant.

7. The system of claim 1 in which said source of a pulsatory excitation comprises a tuned resonant circuit, said electrical quantity comprising said oscillators, means applying said oscillators to said resonant circuit, detector means connected to said resonant circuit, and means applying the output of said detector circuit to said pulse generating device, whereby said pulse generating device is energized to produce a pulse for energizing said magnetron upon the frequency of said oscillations passing the frequency of said resonant circuit.

8. The system of claim 1 in which said source of a pulsatory excitation signal comprises a plurality of tuned resonant circuits, said electrical quantity comprising said oscillations, means applying said oscillations to said resonant circuits, detector means connected to each resonant circuit, gate circuit means connected to the output of each said detector means, program means responsive to the pulses of said pulsatory excitation signal for opening said gate circuit means in a predetermined sequence, and means for applying the outputs of said gate circuit means to said pulse generating device.

9. The system of claim 8 in which said control means comprises means for holding the frequency of said oscillations constant for a predetermined time following each occurrence of a pulse of said pulsatory energizing signal, wherein said means applying the outputs of said gate circuit means and said pulse generating means comprising means inhibiting the passage of pulses from said gate circuit means during said predetermined time when said oscillation frequency is held constant.

References Cited
UNITED STATES PATENTS

| | | | |
|---|---|---|---|
| 2,677,058 | 4/1954 | Kirkman | 328—184 X |
| 3,028,594 | 4/1962 | Rychlik | 331—90 X |
| 3,163,862 | 12/1964 | Jenny | 343—17.2 X |
| 3,168,712 | 2/1965 | Backmark | 325—121 X |
| 3,249,937 | 5/1966 | As et al. | 343—17.2 X |
| 3,290,678 | 12/1966 | Carlsson | 343—17.2 X |

RODNEY D. BENNETT, *Primary Examiner.*

J. P. MORRIS, *Assistant Examiner.*

UNITED STATES PATENT OFFICE
CERTIFICATE OF CORRECTION

Patent No. 3,358,282                      December 12, 1967

Nils Arne Erland Wästerlid

It is certified that error appears in the above identified patent and that said Letters Patent are hereby corrected as shown below:

Column 2, line 33, "valve" should read -- value --; line 52, "intreval" should read -- interval --. Column 6, lines 22 and 23, "12(curve d3)" should read -- 13 (curve d) --. Column 10, line 19, "following" should read -- follow --.

Signed and sealed this 28th day of October 1969.

(SEAL)
Attest:

Edward M. Fletcher, Jr.                   WILLIAM E. SCHUYLER, JR.
Attesting Officer                         Commissioner of Patents